United States Patent
Iijima

(10) Patent No.: US 9,035,924 B2
(45) Date of Patent: May 19, 2015

(54) SHUTTER GLASSES AND IMAGE DISPLAY SYSTEM

(75) Inventor: Chiyoaki Iijima, Ina (JP)

(73) Assignee: SEIKO EPSON CORPORATION, Tokyo (JP)

( * ) Notice: Subject to any disclaimer, the term of this patent is extended or adjusted under 35 U.S.C. 154(b) by 136 days.

(21) Appl. No.: 13/287,444

(22) Filed: Nov. 2, 2011

(65) Prior Publication Data

US 2012/0120075 A1    May 17, 2012

(30) Foreign Application Priority Data

Nov. 17, 2010 (JP) .................................. 2010-256549

(51) Int. Cl.
*H04N 13/04* (2006.01)
*G02B 27/22* (2006.01)

(52) U.S. Cl.
CPC ........ *H04N 13/0438* (2013.01); *G02B 27/2264* (2013.01); *H04N 13/0459* (2013.01); *H04N 2213/008* (2013.01)

(58) Field of Classification Search
CPC .................................................. G02B 27/2264
USPC .......................................................... 349/13
See application file for complete search history.

(56) References Cited

U.S. PATENT DOCUMENTS

| | | | | |
|---|---|---|---|---|
| 5,506,705 A | * | 4/1996 | Yamamoto et al. | 349/13 |
| 5,699,133 A | * | 12/1997 | Furuta | 349/13 |
| 6,992,731 B1 | * | 1/2006 | Morris | 349/13 |
| 7,859,635 B2 | * | 12/2010 | Yokoyama et al. | 349/155 |
| 2008/0303963 A1 | * | 12/2008 | Jung et al. | 349/13 |
| 2010/0259601 A1 | * | 10/2010 | Inoue et al. | 348/51 |
| 2010/0289883 A1 | * | 11/2010 | Goris et al. | 348/56 |

FOREIGN PATENT DOCUMENTS

| | | |
|---|---|---|
| JP | A-2007-110683 | 4/2007 |
| JP | A-2009-031524 | 2/2009 |
| JP | A-2010-117437 | 5/2010 |
| WO | WO 2011/152451 A1 | 12/2011 |

* cited by examiner

*Primary Examiner* — Srilakshmi K Kumar
*Assistant Examiner* — Damon Treitler
(74) *Attorney, Agent, or Firm* — Oliff PLC

(57) ABSTRACT

A pair of shutter glasses capable of reducing decrease in brightness of displayed images to be visually recognized is provided. A pair of shutter glasses include a pair of light selectors the state of each of which is switched between a light transmitting state in which the light selector transmits light and a light blocking state in which the light selector blocks light. When a full area where light is transmitted or blocked in the light transmitting state or the light blocking state is virtually divided into a plurality of divided areas along a first direction, each of the light selectors switches the state of each of the plurality of divided areas between the light transmitting state and the light blocking state sequentially along the first direction.

12 Claims, 12 Drawing Sheets

SHUTTER GLASSES AND IMAGE DISPLAY SYSTEM

BACKGROUND

1. Technical Field

The present invention relates to a pair of shutter glasses and an image display system.

2. Related Art

There has been a known image display system (3D display apparatus) including an image display apparatus that displays images and a pair of shutter glasses worn by a viewer and allowing the viewer to stereoscopically view the images displayed by the image display apparatus through the shutter glasses (see JP-A-2010-117437, for example).

FIGS. 12A and 12B describe the operation of an image display system of related art.

Specifically, FIG. 12A is a timing chart showing the timing at which image data are written along each scan line in an image display apparatus, and the vertical axis of FIG. 12A corresponds to the vertical direction of the image display apparatus (the vertical axis represents the positions of the uppermost scan line L1 to the lowermost scan line Ln). FIG. 12B is a timing chart showing the timings at which a shutter for the left eye (lower part of FIG. 12B) and a shutter for the right eye (upper part of FIG. 12B) that form shutter glasses switch their states between a light transmitting state OP and a light blocking state CL.

In FIG. 12A, to diagrammatically show the timings at which image data are written along the scan lines L1 to Ln, a straight line is drawn to connect a write start timing (update start timing) Ws, at which writing image data along the scan line L1 starts, to a write end timing (update end timing) We, at which writing image data along the scan line Ln ends. It is noted that images displayed by the image display apparatus are labeled with characters for ease of description as follows: An image for the left eye is labeled with "L" and an image for the right eye is labeled with "R" (a parallelogram area represents one of the images described above).

The image display apparatus described in JP-A-2010-117437 is formed of an LCD display including a liquid crystal panel that displays an image in a line sequential drive scheme. The LCD display writes image data sequentially from the uppermost scan line L1 to the lowermost scan line Ln in a vertical scan period, each of Tv1 to Tv4, which is triggered by a vertical sync signal, to update a displayed image, as shown in FIG. 12A. The LCD display updates the displayed image in a first period T1 (vertical scan periods Tv1 and Tv2) and a second period T2 (vertical scan periods Tv3 and Tv4), which are alternately switched therebetween. Specifically, the displayed image is updated to an image for the left eye twice in the first period T1 and updated to an image for the right eye twice in the second period T2.

Each of the shutter glasses (shutter for left eye and shutter for right eye) described in JP-A-2010-117437 is formed of what is called a liquid crystal shutter.

The state of the shutter for the left eye becomes the light transmitting state OP, in which substantially the entire amount of light is transmitted, only in the period from the second left-eye image update start timing Ws to the following first right-eye image update start timing We (vertical scan period Tv2) in a first period T1, whereas becoming the light blocking state CL, in which substantially the entire amount of light is blocked, in the other periods, as shown in the lower portion of FIG. 12B.

On the other hand, the state of the shutter for the right eye becomes the light transmitting state OP only in the period from the second right-eye image update start timing Ws to the following first left-eye image update start timing Ws (vertical scan period Tv4) in a second period T2, whereas becoming the light blocking state CL in the other periods, as shown in the upper portion of FIG. 12B.

That is, the state of each of the shutters for the left and right eyes becomes the light transmitting state OP except periods during which images for the left and right eyes are mixed with each other (a period during which an image for the left eye is updated to an image for the right eye or a period during which an image for the right eye is updated to an image for the left eye). The viewer therefore visually recognizes only an image for the left eye with the left eye and only an image for the right eye with the right eye. The viewer therefore stereoscopically views the displayed images with the aid of parallax.

In the image display system described in JP-A-2010-117437, however, since the state of each of the shutter glasses becomes the light transmitting state OP only in the period described above, the period during which the viewer can visually recognize an image for the left or right eye disadvantageously shortens, resulting in decrease in brightness of displayed images to be visually recognized.

SUMMARY

An advantage of some aspects of the invention is to provide a pair of shutter glasses and an image display system capable of reducing decrease in brightness of displayed images to be visually recognized.

A pair of shutter glasses according to an aspect of the invention includes a pair of light selectors the state of each of which is switched between a light transmitting state in which the light selector transmits light and a light blocking state in which the light selector blocks light. When a full area where light is transmitted or blocked in the light transmitting state or the light blocking state is virtually divided into a plurality of divided areas along a first direction, each of the light selectors switches the state of each of the plurality of divided areas between the light transmitting state and the light blocking state sequentially along the first direction.

According to the aspect of the invention, since the light selectors that form the shutter glasses are so configured that the state of each of the light selectors can be switched between the light transmitting state and the light blocking state, decrease in brightness of a displayed image to be visually recognized can be reduced by operating the light selectors as follows.

That is, the light selectors are so configured that the vertical scan direction along which an image display apparatus performs line sequential drive agrees with the first direction. Further, the light selectors are so operated that the position where an image displayed in the image display apparatus in the line sequential drive scheme is updated (scan position (position of scan line)) substantially agrees with the position where the state of one of the plurality of divided areas in each of the light selectors is switched to the light transmitting state or the light blocking state (the position of the divided area located at the boundary between the light transmitting state and the light blocking state in the full area where the light transmitting state and the light blocking state are mixed).

This configuration allows the viewer to visually recognize only an image for the left eye with the left eye and an image for the right eye with the right eye through the shutter glasses, for example, even in a period in which the image for the left eye and the image for the right eye are mixed in the image display apparatus.

As a result, the period during which the viewer can visually recognize the displayed images through the shutter glasses can be prolonged while crosstalk in which, for example, the image for the left eye is viewed with the right eye of the viewer is suppressed, whereby decrease in brightness of the displayed images to be visually recognized can be reduced.

In the pair of shutter glasses according to the aspect of the invention, each of the light selectors preferably includes first and second substrates so disposed that the substrates face each other and a liquid crystal material sealed and encapsulated between the first substrate and the second substrate. Each of the first and second substrates preferably has an electrode for applying voltage to the liquid crystal material. At least one of the electrodes on the first and second substrates is preferably formed of a plurality of line electrodes. The plurality of line electrodes preferably extend in a second direction perpendicular to the first direction and are arranged along the first direction in the full area.

In the above variation of the aspect of the invention, at least one of the electrodes provided on the first and second substrates is formed of the plurality of line electrodes described above, which correspond to the plurality of divided areas.

As a result, the state of each of the light selectors can be switched between the light transmitting state and the light blocking state sequentially along the first direction by sequentially selecting each of the plurality of line electrodes and applying voltage thereto and then stopping applying the voltage thereto.

Decrease in brightness of the displayed images to be visually recognized can therefore be reduced by employing the simple configuration in which at least one of the electrodes is formed of a plurality of line electrodes.

In the pair of shutter glasses according to the aspect of the invention, each of the light selectors preferably includes first and second substrates so disposed that the substrates face each other and a liquid crystal material sealed and encapsulated between the first substrate and the second substrate. Each of the first and second substrates preferably has an electrode for applying voltage to the liquid crystal material, and the first and second substrates are preferably so disposed that the distance therebetween gradually increases along the first direction.

In the above variation of the aspect described above, since the first and second substrates are disposed as described above, the thickness of the liquid crystal layer sealed and encapsulated between the first and second substrates gradually increases in the first direction.

In general, a liquid crystal material responds faster when the thickness thereof is smaller.

In view of this fact, for example, applying voltage between the electrodes on the substrates allows each of the plurality of virtually divided areas in the light selectors to be switched to the light blocking state sequentially along the first direction, that is, from a position where the thickness is small toward a position where the thickness is large (first direction). The same holds true for switching the states of the light selectors to the light transmitting state.

Decrease in brightness of displayed images to be visually recognized can therefore be reduced by employing the simple configuration using response characteristics of the liquid crystal material.

An image display system according to another aspect of the invention includes any of the shutter glasses described above, a display section that displays an image, a display control section that drives the display section in a line sequential manner to update the image displayed on the display section to a first image in a first period and to a second image in a second period, the first and second periods alternately switched to each other, and a shutter control section that controls the operation of the light selectors.

According to the above aspect of the invention, since the image display system includes any of the shutter glasses described above, the same advantageous effects as those provided by the shutter glasses described above can be provided.

In the image display system according to the above variation of the above aspect, the shutter control section preferably starts switching the state of each of the plurality of divided areas to the light transmitting state or the light blocking state sequentially along the first direction at a timing shifted from a timing at which updating the image displayed on the display section starts.

According to the above variation of the aspect of the invention, the shutter control section controls the operation of the light selectors as follows.

For example, the shutter control section starts switching the state of each of the plurality of divided areas in the light selector for the right eye to the light transmitting state sequentially along the first direction at a timing after a timing at which an image for the left eye on the display section is updated to an image for the right eye with a delay of a predetermined period.

That is, the position in the light selector for the right eye where the state of each of the plurality of divided areas is switched to the light transmitting state is shifted from the position in the light selector for the right eye that corresponds to the position in the display section where the displayed image is updated to the image for the right eye in the direction opposite the first direction (backward in first direction).

Further, for example, the shutter control section starts switching the state of each of the plurality of divided areas in the light selector for the right eye to the light blocking state sequentially along the first direction at a timing before a timing at which an image for the right eye on the display section is updated to an image for the left eye with an advance of a predetermined period.

That is, the position in the light selector for the right eye where the state of each of the plurality of divided areas is switched to the light blocking state is shifted from the position in the light selector for the right eye that corresponds to the position in the display section where the displayed image is updated to the image for the left eye in the first direction (forward in first direction).

When the shutter control section controls the operation of the light selectors as described above, the viewer visually recognizes only an image for the left eye with the left eye and only an image for the right eye with the right eye even when the positional relationship between the displayed images and the shutter glasses is slightly shifted. That is, crosstalk will not occur.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment of the invention will be described below with reference to the drawings.

Configuration of Image Display System

Figure 1:
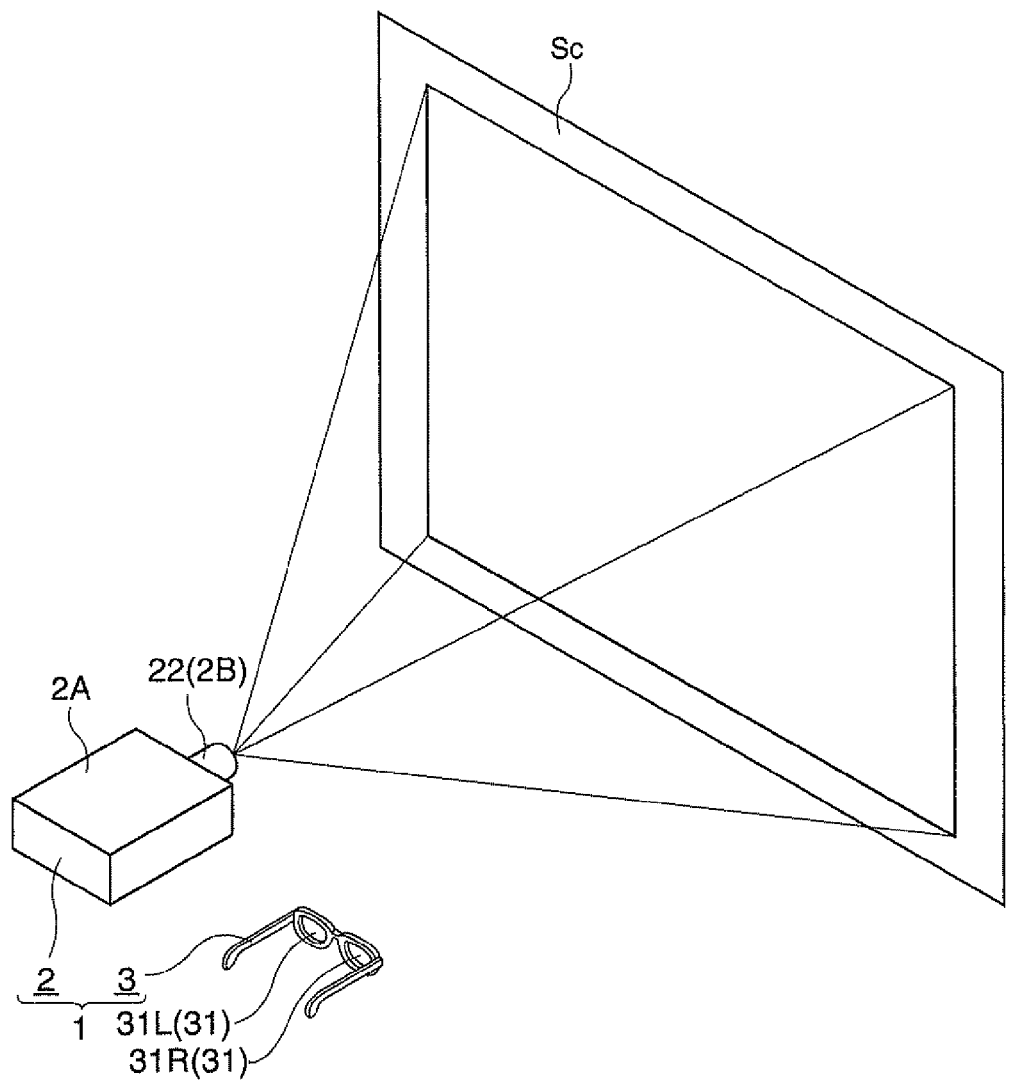
FIG. 1 is a perspective view showing how to use an image display system in a first embodiment.

FIG. 1 is a perspective view showing how to use an image display system 1.

The image display system 1 projects and displays images on a reflective screen Sc (FIG. 1) and allows a viewer to view the projected images stereoscopically.

The image display system 1 includes a projector 2 as an image display apparatus and a pair of shutter glasses 3, as shown in FIG. 1.

Configuration of Projector

Figure 2:
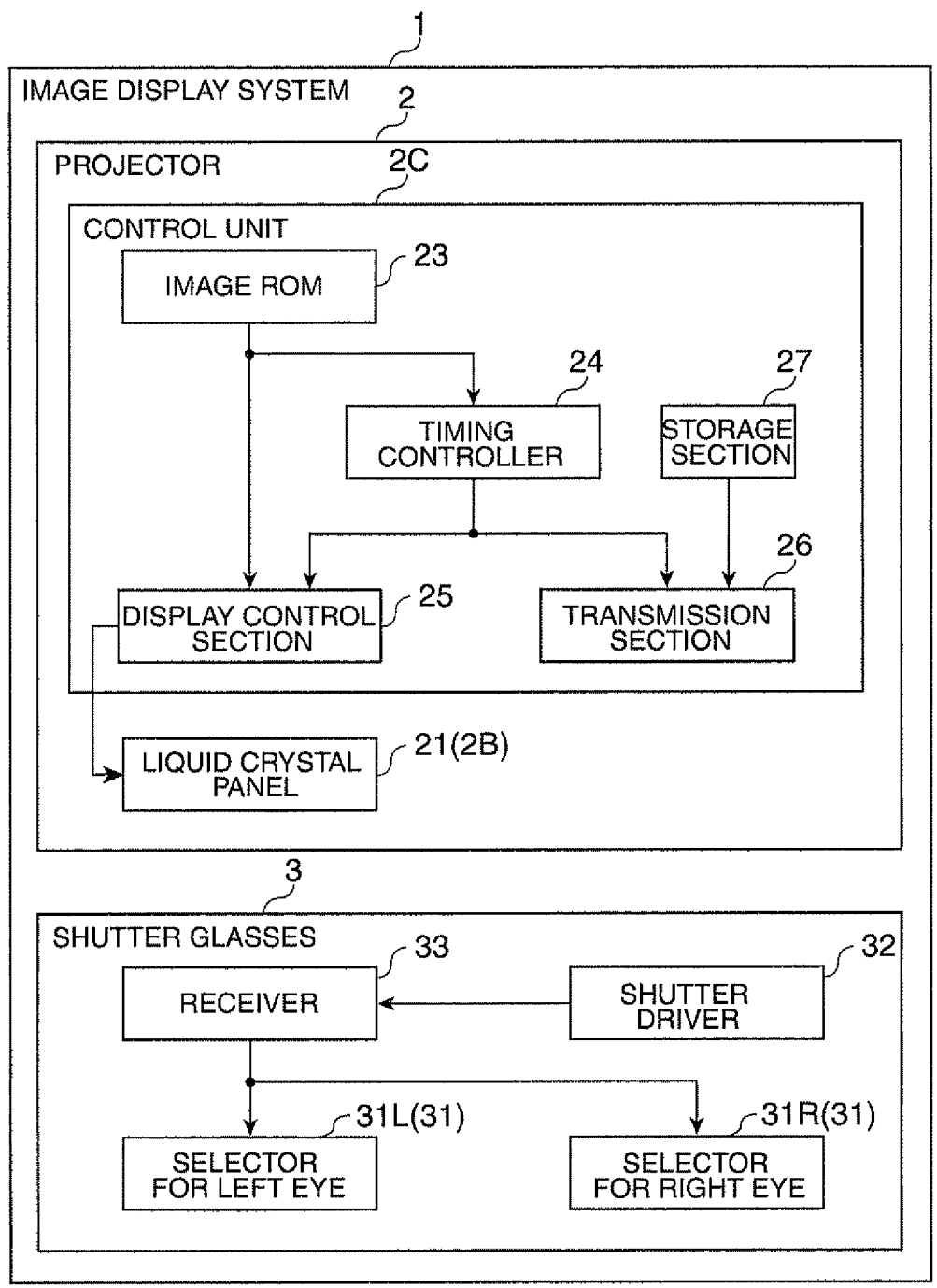
FIG. 2 is a block diagram diagrammatically showing the configuration of the image display system in the first embodiment.

FIG. 2 is a block diagram diagrammatically showing the configuration of the projector 2.

The projector 2 forms an image based on image information (image data) and projects the image on the screen Sc.

The projector 2 includes an exterior housing 2A (FIG. 1), which forms the exterior, and an optical unit 2B and a control unit 2C (FIG. 2) accommodated in the exterior housing 2A, as shown in FIG. 1 or 2.

The optical unit 2B, although not specifically shown, includes a light source, a liquid crystal panel 21 (FIG. 2) as a display section that modulates light outputted from the light source to form an image, and a projection lens 22 (FIG. 1) that projects the image.

The control unit 2C includes a CPU (central processing unit) and other components and controls the operation of the liquid crystal panel 21 and the shutter glasses 3.

The control unit 2C includes an image ROM (read only memory) 23, a timing controller 24, a display control section 25, a transmission section 26 as a shutter control section, and a storage section 27, as shown in FIG. 2.

The image ROM 23 stores image data based on which the liquid crystal panel 21 forms an image.

The image data is formed of left-eye image data on an image for the left eye as a first image and right-eye image data on an image for the right eye as a second image. Each of the image data is formed of a set of data corresponding to a single frame.

The timing controller 24 reads sync signals (vertical sync signal, horizontal sync signal) contained in the image data stored in the image ROM 23 to establish synchronization between the display control section 25 and the transmission section 26.

Figure 3:
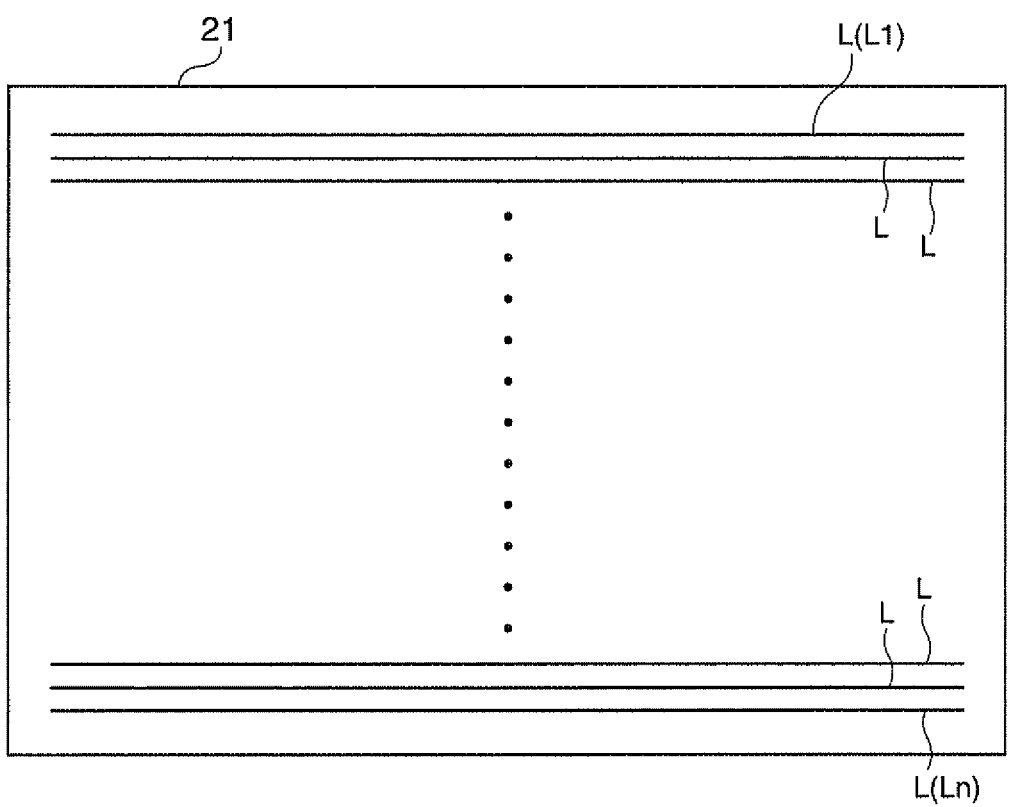
FIG. 3 diagrammatically describes how to drive a liquid crystal panel in the first embodiment.

FIG. 3 diagrammatically describes how to drive the liquid crystal panel 21.

The display control section 25 reads image data stored in the image ROM 23 as appropriate, performs predetermined processing on the image data, and drives the liquid crystal panel 21 in a line sequential manner to display an image based on the image data.

Specifically, the display control section 25 writes the image data on a pixel basis (applies voltage according to grayscale) sequentially from the uppermost scan line L (L1) to the lowermost scan line L (Ln) in the liquid crystal panel 21 in a vertical scan period based on the sync signals outputted from the timing controller 24 to update the image displayed on the liquid crystal panel 21, as shown in FIG. 3. The display control section 25 repeats the same processes described above in the next vertical scan period to update the current image to the next image.

In the following sections, in a single vertical scan period, let Tsc be a scan period from a write start timing Ws at which writing image data along the scan line L1 starts to a write end timing We at which writing image data along the scan line Ln ends for ease of description (see FIGS. 5A and 5B).

The transmission section 26 controls the operation of the shutter glasses 3 by transmitting a switching start timing signal (hereinafter referred to as timing signal) representing the timing at which the state of each light selector 31, which forms the shutter glasses 3 and will be described later, is switched to a light transmitting state or a light blocking state at a predetermined timing.

Specifically, the transmission section 26 transmits the light transmitting/blocking switching start timing signal to the shutter glasses 3 at a timing based on the vertical sync signal outputted from the timing controller 24 and period information stored in the storage section 27.

In the present embodiment, the transmission section 26, although not specifically shown, includes an infrared LED (light emitting diode) and a drive circuit that drives the infrared LED to emit light and transmits the signal described above with an emission period and an emission pattern of the infrared light changed.

The storage section 27 stores information on a first start period and a second start period described below.

Figures 5A, 5B:
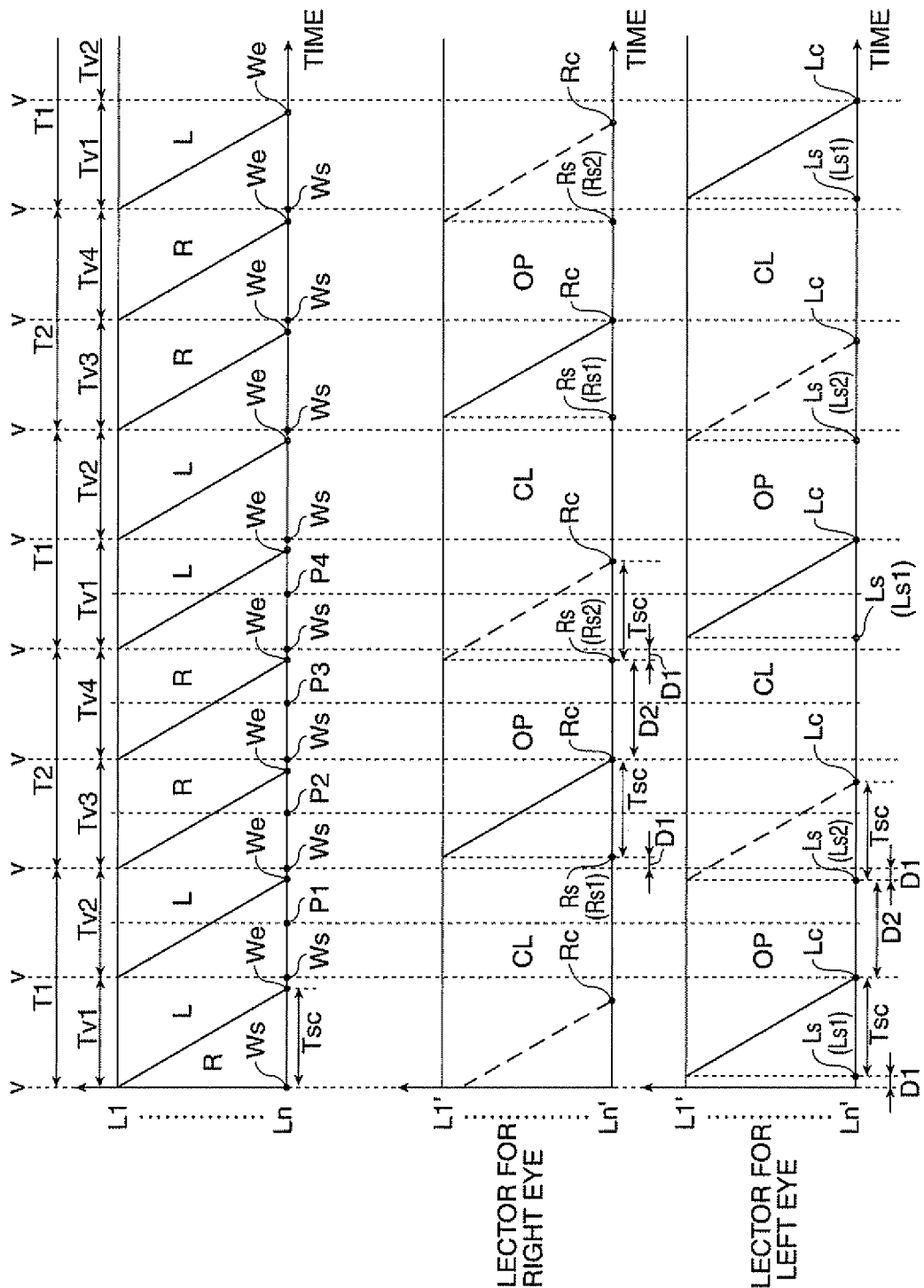
FIGS. 5A and 5B describe the operation of the image display system in the first embodiment.

The first start period corresponds to a period from the timing at which the vertical sync signal is outputted to the timing at which switching the state of either of the light selectors 31 to the light transmitting state starts (corresponding to period D1 shown in FIG. 5B).

The second start period corresponds to a period from the timing at which the vertical sync signal is outputted to the timing at which switching the state of either of the light selectors 31 to the light blocking state starts (corresponding to period D2 shown in FIG. 5B).

The length of the second start period corresponds to the length obtained by subtracting the first start period from the length of a vertical scan period.

In the present embodiment, the first start period is set to be longer than or equal to the scan period Tsc/50 but shorter than or equal to the scan period Tsc/20.

Configuration of Shutter Glasses

The shutter glasses 3, which are worn by the viewer, includes a pair of light selectors 31, a receiver 32 (FIG. 2), and a shutter driver 33 (FIG. 2), as shown in FIG. 1 or 2.

In the following sections, the pair of light selectors 31 divided into the light selector 31 corresponding to the left eye of the viewer, which is called a selector 31L for the left eye, and the light selector 31 corresponding to the right eye of the viewer, which is called a selector 31R for the right eye, for ease of description.

Figure 4A:
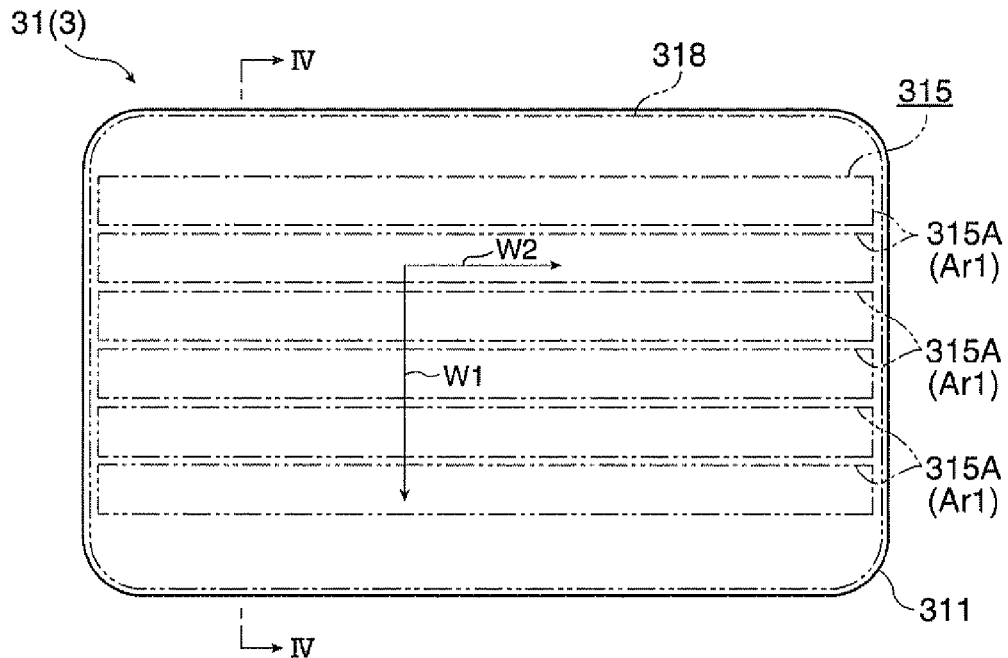
FIGS. 4A and 4B diagrammatically show the configuration of a light selector in the first embodiment.
Figure 4B:
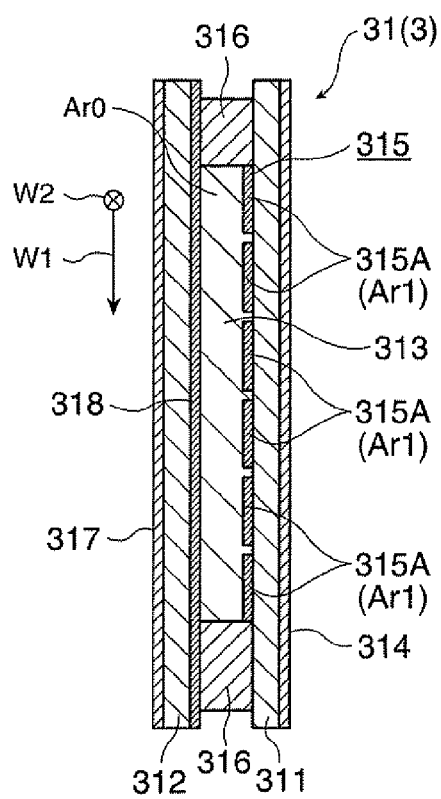

FIGS. 4A and 4B diagrammatically show the configuration of one of the light selectors 31. Specifically, FIG. 4A shows the light selector 31 viewed from the light incident side (the side that faces away from the viewer who wears the shutter glasses 3), and FIG. 4B is a cross-sectional view taken along the line IV-IV shown in FIG. 4A.

In FIG. 4A, the up-down direction corresponds to the vertical direction with respect to the pair of light selectors 31 arranged side by side in the horizontal direction and facing the screen Sc (state shown in FIG. 1). The words "up," "down," and "vertical direction" in the following description also mean "up," "down," and "vertical direction" in the state shown in FIG. 1.

Both sides of the pair of light selectors 31 are configured in the same manner, and the states thereof are switched between the light transmitting state, in which light is transmitted, and the light blocking state, in which light is blocked.

Each of the light selectors 31 includes a first substrate 311, a second substrate 312, and a liquid crystal material 313, as shown in FIGS. 4A and 4B.

The first substrate 311 is formed of a light-transmissive rectangular plate and faces the light incident side of the second substrate 312.

The first substrate 311 has a light incident-side end surface to which a first polarizer 314, which transmits only first linearly polarized light out of incident light, is attached, as shown in FIG. 4B.

Further, the first substrate 311 has a light exiting-side end surface (the side closer to the viewer who wears the shutter glasses 3) on which a first transparent electrode 315 is placed, as shown in FIGS. 4A and 4B.

The first transparent electrode 315 is formed of a plurality of line electrodes 315A, as shown in FIGS. 4A and 4B.

In the present embodiment, the number of line electrodes 315A is equal to the number of scan lines L in the liquid crystal panel 21. FIGS. 4A and 4B show only six of the line electrodes 315A for ease of illustration.

The plurality of line electrodes 315A, which are provided to apply voltage to the liquid crystal material 313, are so shaped that they extend in the horizontal direction (second direction W2) and are arranged in the vertical direction (first direction W1 (which agrees with the scan direction in the liquid crystal panel 21)), as shown in FIGS. 4A and 4B.

Each of the line electrodes 315A corresponds to a divided area Ar1 according to the embodiment of the invention. On the other hand, an area surrounded by a spacer 316 corresponds to a full area Ar0 according to the embodiment of the invention where light is transmitted or blocked in the light transmitting or blocking state.

The second substrate 312, which is formed of a light-transmissive rectangular plate as in the case of the first substrate 311, faces the first substrate 311 with the spacer 316 and hence a fixed space therebetween, as shown in FIG. 4B. The first and second substrates 311, 312 and the spacer 316 seal and encapsulate the liquid crystal material 313.

The second substrate 312 has a light exiting-side end surface to which a second polarizer 317, which transmits only second linearly polarized light out of incident light, is attached, as shown in FIG. 4B. The polarization direction of the second linearly polarized light is perpendicular to the polarization direction of the first linearly polarized light.

Further, the second substrate 312 has a light incident-side end surface on which a second transparent electrode 318 is placed, as shown in FIGS. 4A and 4B.

The second transparent electrode 318, which is provided to apply voltage to the liquid crystal material 313, has a shape that planarly covers the plurality of line electrodes 315A, as shown in FIG. 4A.

The receiver 32 receives the signal described above transmitted from the transmission section 26 in the projector 2.

In the present embodiment, the receiver 32, although not specifically shown but including an infrared light receiving device, receives infrared light emitted from the transmission section 26, converts the received infrared light into an electric signal, and outputs the signal to the shutter driver 33.

The shutter driver 33 applies voltage and stops applying the voltage between each of the line electrodes 315A and the second transparent electrode 318 sequentially from the uppermost line electrode 315A to the lowermost line electrode 315A based on the signal from the receiver 32 to switch the state of each of the light selectors 31 between the light transmitting state and the light blocking state.

In the following sections, the positions of the uppermost line electrode 315A to the lowermost line electrode 315A in each of the light selectors 31 are called L1' to Ln' (see FIGS. 5A and 5B), which correspond to the scan lines L1 to Ln in the liquid crystal panel 21 for ease of description.

In the present embodiment, the shutter driver 33 sets a scan period from the time when the state in the uppermost position L1' is switched to the light transmitting state to the time when the state in the lowermost position Ln' is switched to the light transmitting state to be equal to the scan period Tsc of the liquid crystal panel 21 in the projector 2. In other words, the shutter driver 33 drives the light selectors 31 in such a way that the speed at which the states in the uppermost position L1' to the lowermost position Ln' are switched to the light transmitting state is equal to the speed at which image data are written to the uppermost position L1 to the lowermost position Ln (scan speed). The same holds true for the operation of switching to the light blocking state.

Operation of Image Display System

FIGS. 5A and 5B describe the operation of the image display system 1.

Figures 12A, 12B:
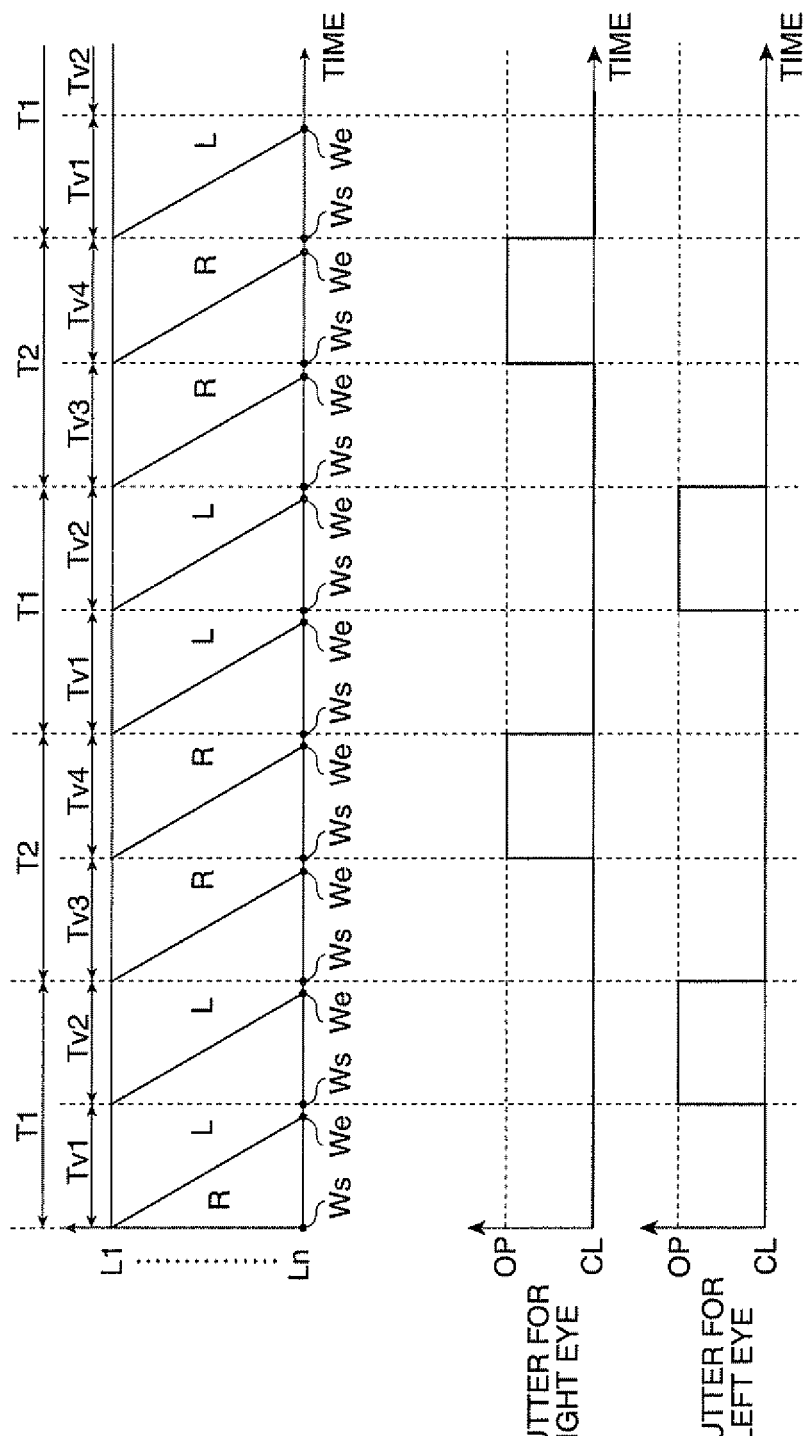
FIGS. 12A and 12B describe the operation of an image display system of related art.

Specifically, FIG. 5A is a timing chart similar to that in FIG. 12A. FIG. 5B is a timing chart showing the timings at which the states in the positions L1' to Ln' in the selector 31L for the left eye (lower part of FIG. 5B) and the selector 31R for the right eye (upper part of FIG. 5B) are switched between the light transmitting state and the light blocking state, and the vertical axis of the FIG. 5B represents the vertical direction (uppermost position L1' to lowermost position Ln') of the light selectors 31.

In FIG. 5B, straight lines are drawn to connect switching timings Ls and Rs in the uppermost position L1' to switching timings Le and Re in the lowermost position Ln', as in FIG. 5A. Further, a broken straight line represents switching to the light blocking state, and a solid straight line represents switching to the light transmitting state. It is noted that the states of each of the light selectors 31 are labeled with characters as follows: the light transmitting state is labeled with "OP" and the light blocking state is labeled with "CL" (a parallelogram area surrounded by a broken line and a solid line represents one of the states described above).

The operation of the image display system 1 described above will next be described with reference to FIGS. 5A and 5B.

In the following sections, the operation of the image display system 1 will be described in the following order for ease of description: the operation of the projector 2 and the operation of the shutter glasses 3.

Operation of Projector

The control unit 2C controls the operation of the liquid crystal panel 21 as will be described below.

The display control section 25 updates the image displayed on the liquid crystal panel 21 whenever a vertical scan period, Tv1 to Tv4, starts (every 1/240 (sec) in the present embodiment) to an image for the left eye, an image for the left eye, an image for the right eye, and an image for the right eye in this order, as shown in FIG. 5A. In other words, the display control section 25 updates the image displayed on the liquid crystal panel 21 in a first period T1 (vertical scan periods Tv1 and Tv2) and a second period T2 (vertical scan periods Tv3 and Tv4), which are alternately switched therebetween. That is, the displayed image is updated to an image for the left eye twice in the first period T1 and updated to an image for the right eye twice in the second period T2.

Specifically, the display control section 25 starts writing image data along the scan line L1 at a write start timing Ws, which substantially coincides with a timing V at which the timing controller 24 outputs the vertical sync signal, and sequentially writes image data down to the scan line Ln to update the image displayed on the liquid crystal panel 21.

Further, the transmission section 26 transmits a signal representing the timing at which switching the state of each of the selectors 31L and 31R to the light transmitting state OP or the light blocking state CL to the shutter glasses 3 based on the vertical sync signal from the timing controller 24 and the information stored in the storage section 27.

The transmission section 26 transmits a signal representing the timing at which switching the state of the selector 31L for the left eye to the light transmitting state OP starts to the shutter glasses 3 at the timing shown below.

That is, the transmission section 26 transmits a signal representing the timing at which switching the state of the selector 31L for the left eye to the light transmitting state OP starts at a timing Ls1 after the time when a vertical scan period Tv1 starts with a delay of the first start period D1, as shown in the lower portion of FIG. 5B.

The timing Ls1 corresponds to a timing after a left-eye image write start timing Ws, at which writing a first image for the left eye to be updated in a first period T1 starts, with a delay of the first start period D1.

Further, the transmission section 26 transmits a signal representing the timing at which switching the state of the selector 31L for the left eye to the light blocking state CL starts to the shutter glasses 3 at the timing shown below.

That is, the transmission section 26 transmits a signal representing the timing at which switching the state of the selector 31L for the left eye to the light blocking state CL starts at a timing Ls2 after the time when a vertical scan period Tv2 starts with a delay of the second start period D2, as shown in the lower portion of FIG. 5B.

The timing Ls2 corresponds to a timing before a right-eye image write start timing Ws, at which writing a first image for the right eye to be updated in a second period T2 starts, by an advance of the first start period D1.

On the other hand, the transmission section 26 transmits a signal representing the timing at which switching the state of the selector 31R for the right eye to the light transmitting state OP starts to the shutter glasses 3 at the timing shown below.

That is, the transmission section 26 transmits a signal representing the timing at which switching the state of the selector 31R for the right eye to the light transmitting state OP starts at a timing Rs1 after the time when a vertical scan period Tv3 starts with a delay of the first start period D1, as shown in the upper portion of FIG. 5B.

The timing Rs1 corresponds to a timing after a right-eye image write start timing Ws, at which writing a first image for the right eye to be updated in a second period T2 starts, with a delay of the first start period D1.

Further, the transmission section 26 transmits a signal representing the timing at which switching the state of the selector 31R for the right eye to the light blocking state CL starts to the shutter glasses 3 at the timing shown below.

That is, the transmission section 26 transmits a signal representing the timing at which switching the state of the selector 31R for the right eye to the light blocking state CL starts at a timing Rs2 after the time when a vertical scan period Tv4 starts with a delay of the second start period D2, as shown in the upper portion of FIG. 5B.

The timing Rs2 corresponds to a timing before a left-eye image write start timing Ws, at which writing a first image for the left eye to be updated in a first period T1 starts, by an advance of the first start period D1.

Operation of Shutter Glasses

The shutter driver 33 recognizes the timings Ls1, Ls2, Rs1, and Rs2, at which the states of the selectors 31L and 31R are switched to the light transmitting state OP or the light blocking state CL, based on the signal from the receiver 32.

The shutter driver 33 then starts switching the states of the selectors 31L and 31R to the light transmitting state OP at the respective switching start timings Ls1 and Rs1 from the uppermost position L1' to the lowermost position Ln', as shown in FIG. 5B.

Further, the shutter driver 33 starts switching the states of the selectors 31L and 31R to the light blocking state CL at the respective switching start timings Ls2 and Rs2 from the uppermost position L1' to the lowermost position Ln'.

FIGS. 6A and 6B to 9A and 9B show projected images and the states of the selectors 31L and 31R. Specifically, FIGS. 6A to 9A show images projected on the screen Sc at points of time P1 to P4 shown in FIGS. 5A and 5B, and FIGS. 6B to 9B show the states of the selectors 31L and 31R at the points of time P1 to P4.

In FIGS. 6A to 9A, an image for the left eye is labeled with "Left" and an image for the right eye is labeled with "Right." In FIGS. 6B to 9B, the light selectors 31 in the light blocking state CL are hatched.

Figure 6A:
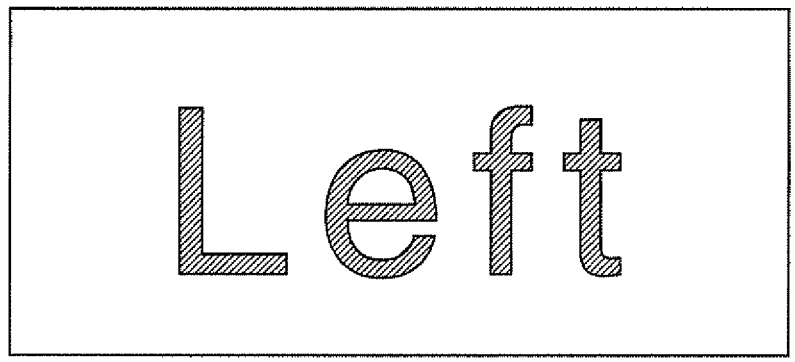
FIGS. 6A and 6B show a projected image and the states of the selectors in the first embodiment.

The image display system 1, which operates as described above, displays only an image for the left eye on the screen Sc as shown in FIG. 6A, for example, at the point of time P1 because the displayed image is being updated to a second image for the left eye in the first period T1.

Figure 6B:
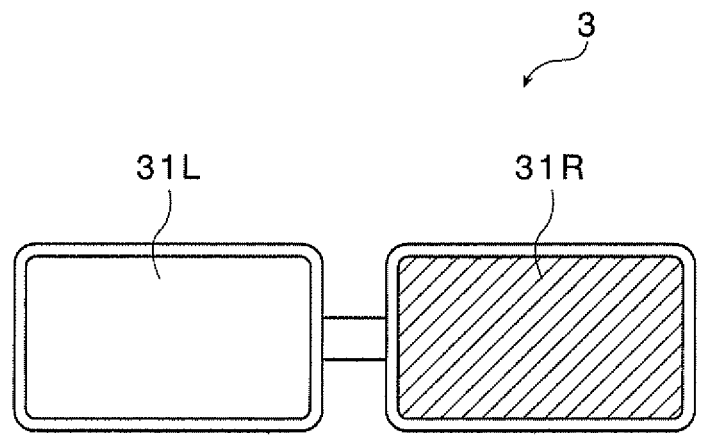

In the shutter glasses 3, on the other hand, the selector 31L for the left eye is in the light transmitting state OP and the selector 31R for the right eye is in the light blocking state CL, as shown in FIG. 6B.

The image for the left eye on the screen Sc is therefore visually recognized only with the left eye of the viewer.

Figure 7A:
FIGS. 7A and 7B show another projected image and the states of the selectors in the first embodiment.

At the point of time P2, since the image for the left eye is being updated to an image for the right eye in the second period T2, part of the image for the right eye is displayed in the upper portion of the screen Sc and part of the image for the left eye is displayed in the lower portion of the screen Sc, as shown in FIG. 7A. That is, the projected image is a mixture of the image for the left eye and the image for the right eye.

In FIG. 7A, LA represents an update position where the image for the left eye is being updated to the image for the right eye (scan position (the position of the scan line located at the boundary between the image for the left eye and the image for the right eye)).

Figure 7B:
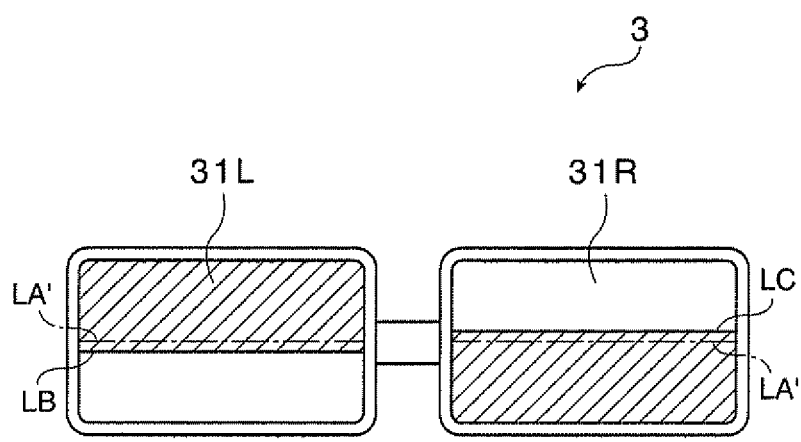

Since the selector 31L for the left eye is switching its state to the light blocking state CL from the uppermost position L1' to the lowermost position Ln', only the upper portion of the selector 31L for the left eye is in the light blocking state CL, whereas the lower portion still remains in the light transmitting state OP, as shown in FIG. 7B.

In FIG. 7B, LA' represents the position in each of the selectors 31L and 31R (position of line electrode 315A) that corresponds to the update position LA. Further, LB represents the position where the state of the selector 31L for the left eye is being switched to the light blocking state CL (the position of the line electrode 315A located at the boundary between the light transmitting state OP and the light blocking state CL).

The selector 31L for the left eye switches its state to the light blocking state CL from the uppermost position L1' at the timing Ls2 before the write start timing Ws, at which writing a first image for the right eye to be updated in the second period T2 starts, by an advance of the first start period D1. That is, the switching position LB is advanced downward from the position LA' corresponding to the update position LA, as shown in FIG. 7B.

As a result, when the viewer visually recognizes the projected image (FIG. 7A), which is a mixture of the image for the left eye and the image for the right eye, through the selector 31L for the left eye, the viewer only visually recognizes the image for the left eye displayed in the lower portion without visually recognizing the image for the right eye displayed in the upper portion.

As described above, the first start period D1 is set to be longer than or equal to the scan period Tsc/50 but shorter than or equal to the scan period Tsc/20. The distance between the switching position LB and the position LA' therefore corresponds to the number of scan lines greater than or equal to n/50 but smaller than or equal to n/20, where n represents the total number of scan lines L1 to Ln in the liquid crystal panel 21.

On the other hand, since the selector 31R for the right eye is switching its state to the light transmitting state OP from the uppermost position L1' to the lowermost position Ln', only the upper portion of the selector 31R for the right eye is in the light transmitting state OP, whereas the lower portion still remains in the light blocking state CL, as shown in FIG. 7B.

In FIG. 7B, LC represents the position where the state of the selector 31R for the right eye is being switched to the light transmitting state OP (the position of the line electrode 315A located at the boundary between the light transmitting state OP and the light blocking state CL).

The selector 31R for the right eye switches its state to the light transmitting state OP from the uppermost position L1' at the timing Rs1 after the write start timing Ws, at which writing a first image for the right eye to be updated in the second period T2 starts, with a delay of the first start period D1. The switching position LC is therefore retarded upward with a delay from the position LA' corresponding to the update position LA, as shown in FIG. 7B.

As a result, when the viewer visually recognizes the projected image (FIG. 7A), which is a mixture of the image for the left eye and the image for the right eye, through the selector 31R for the right eye, the viewer only visually recognizes the image for the right eye displayed in the upper portion without visually recognizing the image for the left eye displayed in the lower portion.

The distance between the switching position LC and the position LA' corresponds to the number greater than or equal to n/50 but smaller than or equal to n/20, as in the case described above.

Figure 8A:
FIGS. 8A and 8B show another projected image and the states of the selectors in the first embodiment.

At the point of time P3, since the displayed image is being updated to a second image for the right eye in the second period T2, only the image for the right eye is displayed on the screen Sc, as shown in FIG. 8A.

Figure 8B:
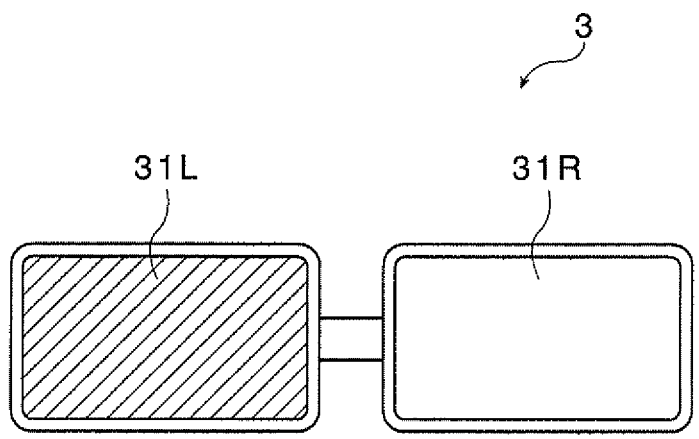

In the shutter glasses 3, on the other hand, the selector 31R for the right eye is in the light transmitting state OP and the selector 31L for the left eye is in the light blocking state CL, as shown in FIG. 8B.

The image for the right eye on the screen Sc is therefore visually recognized only with the right eye of the viewer.

Figure 9A:
FIGS. 9A and 9B show another projected image and the states of the selectors in the first embodiment.

At the point of time P4, since the image for the right eye is being updated to an image for the left eye in the first period T1, part of the image for the left eye is displayed in the upper portion of the screen Sc and part of the image for the right eye is displayed in the lower portion of the screen Sc as shown in FIG. 9A, in contrast with FIG. 7A.

In FIG. 9A, the update position where the image for the right eye is being updated to the image for the left eye (scan position (the position of the scan line located at the boundary between the image for the left eye and the image for the right eye)) coincides with the update position LA in FIG. 7A.

Figure 9B:
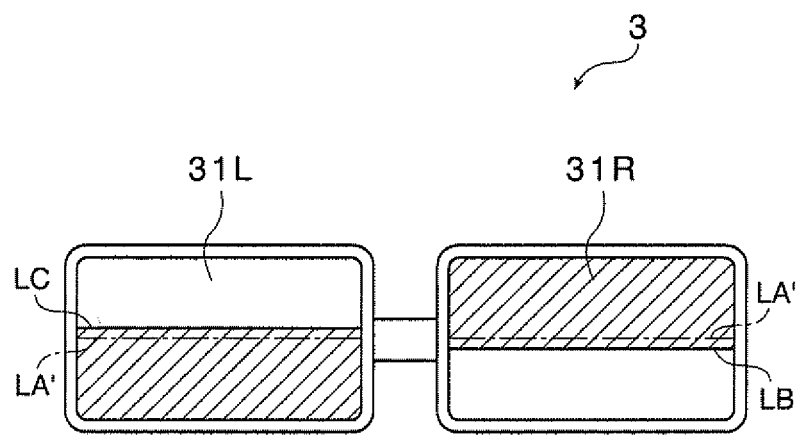

In the shutter glasses 3, the selector 31L for the left eye has the same state as that of the selector 31R for the right eye at the point of time P2 (FIG. 7B), and the selector 31R for the right eye has the same state as that of the selector 31L for the left eye at the point of time P2 (FIG. 7B), as shown in FIG. 9B.

As a result, when the viewer visually recognizes the projected image (FIG. 9A), which is a mixture of the image for the left eye and the image for the right eye, the viewer visually recognizes the image for the left eye displayed in the upper portion only through the selector 31L for the left eye and visually recognizes the image for the right eye displayed in the lower portion only through the selector 31R for the right eye.

The first embodiment described above provides the following advantages.

In the present embodiment, each of the light selectors 31 is so configured that its state can be switched between the light transmitting state OP and the light blocking state CL sequentially along the first direction W1.

As a result, even in a period in which an image for the left eye and an image for the right eye are mixed in the projector 2 (vertical scan periods Tv1 and Tv3), the viewer visually recognizes only the image for the left eye with the left eye and only the image for the right eye with the right eye through the shutter glasses 3.

The period during which the viewer visually recognizes a projected image through the shutter glasses 3 can therefore be prolonged while crosstalk is suppressed, whereby decrease in brightness of the projected image to be visually recognized can be reduced.

Further, the first transparent electrode 315 is formed of a plurality of line electrodes 315A.

Each of the plurality of line electrodes 315A can be sequentially selected and set to be the voltage applied state or the no voltage applied state, whereby each of the light selectors 31 can switch its state to the light transmitting state OP or the light blocking state CL sequentially along the first direction W1.

The simple configuration in which the first transparent electrode 315 is formed of a plurality of line electrodes 315A can therefore reduce decrease in brightness of a projected image to be visually recognized.

Further, the transmission section 26 transmits signals for starting switching to the light transmitting state OP or the light blocking state CL at the timings Ls1, Rs1, Ls2, and Rs2, each of which is shifted from an image data write start timing Ws, sequentially along the first direction W1.

As a result, even when an image projected on the screen Sc and the shutter glasses 3 are not ideally positioned but are slightly shifted from each other, the viewer can visually recognize only an image for the left eye with the left eye and only an image for the right eye with the right eye. That is, crosstalk will not occur.

Second Embodiment

A second embodiment of the invention will next be described with reference to the drawings.

In the following description, configurations that are similar to and members that are the same as those in the first embodiment have the same reference characters, and detailed description of these configurations and members will be omitted or simplified.

Figure 10A:
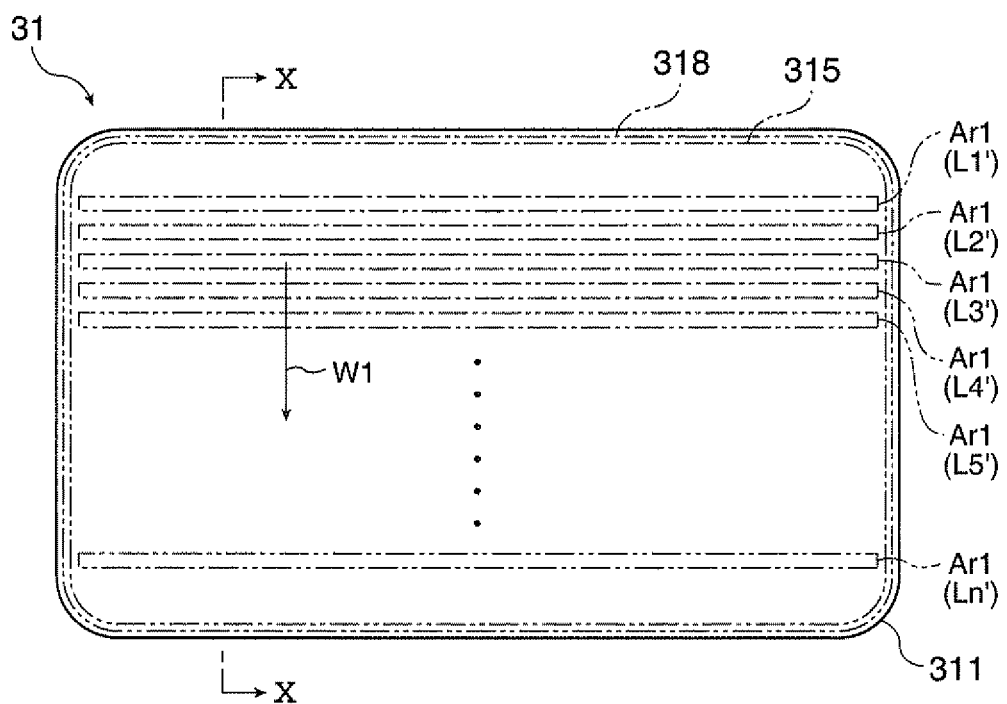
FIGS. 10A and 10B diagrammatically show the configuration of a light selector in a second embodiment.
Figure 10B:
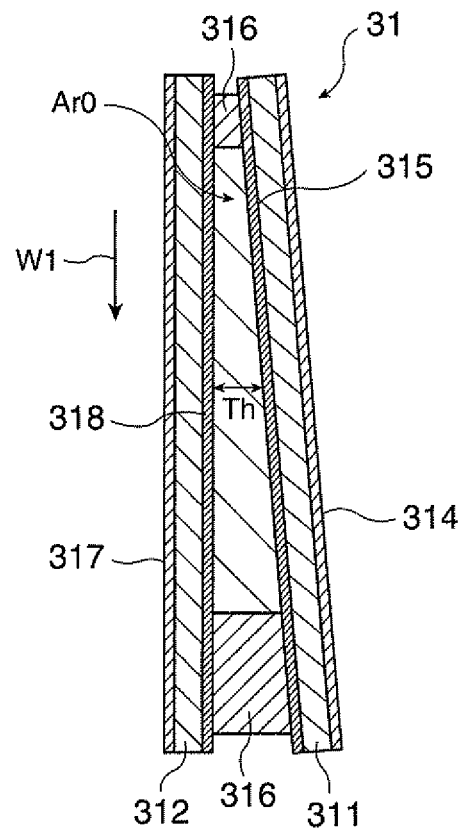

FIGS. 10A and 10B diagrammatically show the configuration of a light selector 31 in the second embodiment. Specifically, FIG. 10A shows the light selector 31 viewed from the light incident side, and FIG. 10B is a cross-sectional view taken along the line X-X shown in FIG. 10A.

In FIG. 10A, a full area Ar0 surrounded by a spacer 316 is virtually divided along the first direction W1 into a plurality of divided areas Ar1, each of which is drawn with a broken line. The positions of the divided areas Ar1 correspond to the positions L1' to Ln' described in the first embodiment.

The present embodiment differs from the first embodiment only in terms of the layout of the first substrate 311 and the second substrate 312 and the shape of the first transparent electrode 315, as shown in FIGS. 10A and 10B. Other configurations in the second embodiment are the same as those in the first embodiment.

Specifically, the first substrate 311 and the second substrate 312 in the second embodiment are so disposed that they are separated by a greater distance along the downward direction (along first direction W1), as shown in FIGS. 10A and 10B.

That is, the liquid crystal material 313 sealed and encapsulated between the first substrate 311 and the second substrate 312 has a thickness Th that increases along the downward direction.

Further, the first transparent electrode 315 in the second embodiment has substantially the same shape as that of the second transparent electrode 318, as shown in FIGS. 10A and 10B.

Figure 11A:
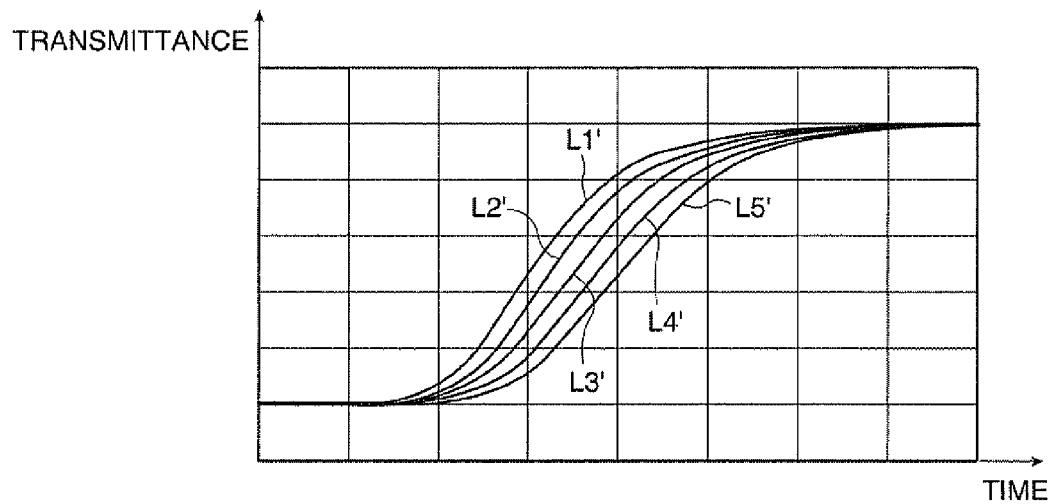
FIGS. 11A and 11B show response characteristics of the light selector in the second embodiment.
Figure 11B:
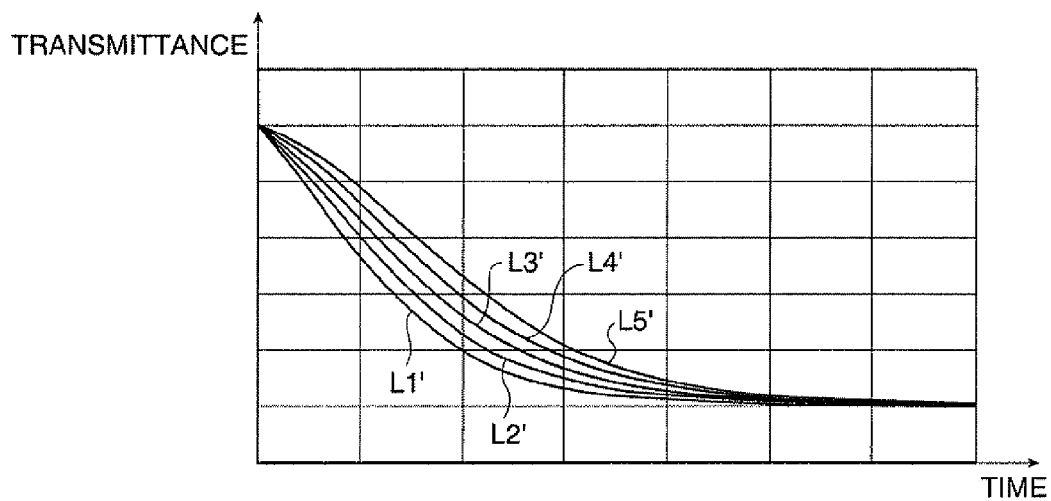

FIGS. 11A and 11B show response characteristics of the light selectors 31. Specifically, in FIGS. 11A and 11B, the horizontal axis represents time, and the vertical axis represents transmittance of the light selectors 31.

FIGS. 11A and 11B show response characteristics of the light selectors 31 only in the positions L1' to L5' (FIG. 10A) for ease of description.

In the liquid crystal material 313, it responds faster when the thickness Th is smaller.

That is, the period necessary for the light selectors 31 to start switching their states to the light transmitting state OP and reach the light transmitting state OP is minimized when the thickness Th is minimized in the uppermost position L1', as shown in FIG. 11A. The period gradually increases with the thickness Th through the lower positions L2' to L5'.

The same holds true for the period necessary for the light selectors 31 to start switching their states to the light blocking state CL and reach the light blocking state CL, as shown in FIG. 11B.

In the present embodiment, the transparent electrodes 315 and 318 are commonly used from the uppermost position L1' through the lowermost position Ln', as shown in FIGS. 10A and 10B.

The shutter driver 33 therefore applies voltage and stops applying the voltage between the transparent electrodes 315 and 318 to switch the light transmitting state to the light blocking state and vice versa sequentially from the uppermost position L1' to the lowermost position Ln'.

In the present embodiment, the period from the time when switching the state in the uppermost position L1' to the light transmitting state ends to the time when switching the state in the lowermost position Ln' to the light transmitting state ends is set to be equal to the scan period Tsc by setting the thickness Th as appropriate. In other words, the speed at which the states in the uppermost to lowermost positions L1' to Ln' are switched to the light transmitting state is set to be equal to the speed at which image data are written to the uppermost to lowermost positions L1 to Ln (scan speed). The same holds true for the operation of switching to the light blocking state.

That is, when the shutter driver 33 applies no voltage between the transparent electrodes 315 and 318 at the switching start timings Ls1 and Rs1 described in the first embodiment, whereas applying voltage between the transparent electrodes 315 and 318 at the switching start timings Ls2 and Rs2, the light selectors 31 operates in the same manner as in the first embodiment.

In the other respects, the image display system 1 in the second embodiment operates in the same manner as in the first embodiment, and no description of the other operations will therefore made.

The second embodiment described above provides the following advantages as well as the advantages provided in the first embodiment.

In the present embodiment, the thickness Th of the liquid crystal material 313 increases in the downward direction.

As a result, applying voltage between the transparent electrodes 315 and 318 allows the states of the light selectors 31 in the plurality of virtually divided areas Ar1 to be switched to the light blocking state CL sequentially along the first direction W1, that is, sequentially from the position L1', where the thickness Th is small, to the position Ln', where the thickness Th is large. The same holds true for switching the states of the light selectors 31 to the light transmitting state OP.

The simple configuration using the response characteristics of the liquid crystal material 313 therefore reduces decrease in brightness of a projected image to be visually recognized.

The invention is not limited to the embodiments described above. Changes, improvements, and other modifications can be made thereto to the extent that the advantage of some aspects of the invention is achieved, and these changes, improvements, and other modifications fall within the scope of the invention.

In each of the embodiments described above, the image display system 1 allows the viewer to stereoscopically view displayed images formed of first and second images as images for the left and right eyes but the image display system does not necessarily configured this way. For example, the image display system may display first and second images having contents different from each other and allow different viewers to visually recognize the two displayed images (first and second images).

When the image display system is configured as described above, the shutter glasses 3 may be replaced with the following two types of glasses: a pair of glasses having only the selector 31L for the left eye (the number of selectors 31L for the left eye may be one or more) and a pair of glasses having only the selector 31R for the right eye (the number of selectors 31R for the right eye may be one or more).

In the first embodiment described above, each of the light selectors 31 is formed of a shutter using the liquid crystal material 313, but the light selectors 31 are not necessarily configured this way. The light selectors may alternatively be configured in any other manner as long as the state thereof is switched between the light transmitting state OP and the light blocking state CL sequentially along the first direction W1. For example, the state may be mechanically switched between the light transmitting state and the light blocking state.

In each of the embodiments described above, image data based on which the liquid crystal panel 21 forms an image is stored in the image ROM 23, but image data is not necessarily stored this way. To display images based on an image signal inputted from a component external to the projector 2, the image display system may include an image signal converter that coverts an externally inputted image signal (such as brightness/color difference signal and analog RGB signal) into a digital RGB signal having a predetermined word length and supplies data on first and second images to the display control section 25 at predetermined timings.

In each of the embodiments described above, the image display system 1 has been described only with reference to the case where the front projection projector 2 is used. The invention may alternatively be applied to a configuration including a screen and a rear projection projector that projects an image through the rear side of the screen.

In each of the embodiments described above, the image display system 1 includes the projector 2, but the image display system 1 does not necessarily include a projector. The image display system 1 may alternatively include a liquid crystal display, a plasma television, an organic EL (electro luminescence) display, or any other suitable display.

In the first embodiment, the light transmitting state OP is switched to the light blocking state CL and vice versa sequentially from the uppermost position L1' to the lowermost position Ln', but the switching is not necessarily performed this way.

For example, depending on the position of the viewer (position of shutter glasses 3) relative to the screen Sc, a projected image may deviate from the full area Ar0 in each of the light selectors 31 in some cases when the viewer visually recognizes the projected image on the screen Sc through the shutter glasses 3.

To address the problem, the light transmitting state OP may be sequentially switched to the light blocking state CL and vice versa in an arbitrary range of the full area from the position L1' to the position Ln' as follows.

That is, consider a case where the viewer visually recognizes an image projected on the screen Sc through the shutter glasses 3 located in a variety of positions relative to the screen Sc and the following information is stored in the storage section 27 or any other suitable component: ranges in the full area Ar0 within which the projected image is visually recognized (arbitrary ranges in the full area Ar0 from the positions L1' to Ln') and the speed at which the light transmitting state is switched to the light blocking state and vice versa from the uppermost position to the lowermost position in each of the ranges.

An ultrasonic sensor or any other distance sensor is attached to the shutter glasses 3.

The distance sensor allows the shutter driver 33 to recognize the position (spatial coordinates) of the shutter glasses 3 relative to the screen Sc.

The shutter driver 33 then reads a visually recognizing range and a speed corresponding to the recognized position of the shutter glasses 3 from the storage section 27 or any other suitable component.

The shutter driver 33 then switches the light transmitting state OP to the light blocking state CL and vice versa from the uppermost position to the lowermost position at the thus read speed in the thus read visually recognizing range.

In the first embodiment described above, although the first transparent electrode 315 and the second transparent electrode 318 are shaped differently, the two transparent electrodes are not necessarily shaped this way. The second transparent electrode 318 may also be formed of a plurality of line electrodes, as in the case of the first transparent electrode 315.

The invention can be applied to an image display system that includes a projector or any other mage display apparatus and a pair of shutter glasses and allows a viewer to view images stereoscopically.

The entire disclosure of Japanese Patent Application No. 2010-256549, filed Nov. 17, 2010 is expressly incorporated by reference herein.

What is claimed is:

1. A pair of shutter glasses comprising:
a first light selector and a second light selector, the state of each light selector is switched between a light transmitting state in which the light selector transmits light and a light blocking state in which the light selector blocks light,
a full area of a surface of the first light selector and a full area of a surface of the second light selector are each virtually divided into a plurality of divided areas along a first direction, the first light selector and the second light selector switch the state of each of the plurality of divided areas between the light transmitting state and the light blocking state sequentially along the first direction, each of the plurality of divided areas extending in a second direction perpendicular to the first direction, and the first selector and the second light selector being arranged in the second direction,
in a transition period in between periods where one light selector of the first light selector and the second light selector transitions from the light transmitting state to the light blocking state and an other light selector of the first light selector and the second light selector transitions from the light blocking state to the light transmitting state, a light blocking area in the one light selector sequentially increases in the first direction, while a light transmitting area in the other light selector sequentially increases in the first direction, the light transmitting area of the other light selector being disposed in an area of the light blocking portion of the one light selector in the first direction,
the first light selector sequentially transitions a first boundary area in the first light selector to one of the light blocking state and the light transmitting state in the first direction, the first boundary area being a boundary between groups of the plurality of divided areas in the light blocking state and groups of the plurality of divided areas in the light transmitting state,
the second light selector sequentially transitions a second boundary area in the second light selector to an other of the light blocking state and the light transmitting state in the first direction, the second boundary area being a boundary between groups of the plurality of divided areas in the light blocking state and groups of the plurality of divided areas in the light transmitting state, and
the first boundary area and the second boundary area being located in different positions in the first direction.

2. The pair of shutter glasses according to claim 1, wherein each of the light selectors includes
first and second substrates so disposed that the substrates face each other, and a liquid crystal material sealed and encapsulated between the first substrate and the second substrate, each of the first and second substrates has an electrode for applying voltage to the liquid crystal material, at least one of the electrodes on the first and second substrates is formed of a plurality of line electrodes, and the plurality of line electrodes extend in a second direction perpendicular to the first direction and are arranged along the first direction in the full area.

3. The pair of shutter glasses according to claim 1,
wherein each of the light selectors includes
first and second substrates so disposed that the substrates face each other, and
a liquid crystal material sealed and encapsulated between the first substrate and the second substrate,
each of the first and second substrates has an electrode for applying voltage to the liquid crystal material, and
the first and second substrates are so disposed that the distance therebetween gradually increases along the first direction.

4. An image display system comprising:
the shutter glasses according to claim 1;
a display section that displays an image;
a display control section that drives the display section in a line sequential manner to update the image displayed on the display section to a first image in a first period and to a second image in a second period, the first and second periods alternately switched to each other; and
a shutter control section that controls the operation of the light selectors.

5. An image display system comprising:
the shutter glasses according to claim 2;
a display section that displays an image;
a display control section that drives the display section in a line sequential manner to update the image displayed on the display section to a first image in a first period and to a second image in a second period, the first and second periods alternately switched to each other; and
a shutter control section that controls the operation of the light selectors.

6. An image display system comprising:
the shutter glasses according to claim 3;
a display section that displays an image;
a display control section that drives the display section in a line sequential manner to update the image displayed on the display section to a first image in a first period and to a second image in a second period, the first and second periods alternately switched to each other; and
a shutter control section that controls the operation of the light selectors.

7. The image display system according to claim 4,
wherein the shutter control section starts switching the state of each of the plurality of divided areas to the light transmitting state or the light blocking state sequentially along the first direction at a timing shifted from a timing at which updating the image displayed on the display section starts.

8. The image display system according to claim 5,
wherein the shutter control section starts switching the state of each of the plurality of divided areas to the light transmitting state or the light blocking state sequentially along the first direction at a timing shifted from a timing at which updating the image displayed on the display section starts.

9. The image display system according to claim 6,
wherein the shutter control section starts switching the state of each of the plurality of divided areas to the light transmitting state or the light blocking state sequentially along the first direction at a timing shifted from a timing at which updating the image displayed on the display section starts.

10. The pair of shutter glasses according to claim 1, wherein when a full area of each surface of the first light selector and the second light selector are virtually divided into a plurality of divided areas along a first direction, each of the first light selector and the second light selector switches the state of each of the plurality of divided areas between the light transmitting state and the light blocking state sequentially along the first direction, and the plurality of divided areas on the first light selector are sequentially switched in a different timing than the plurality of divided areas on the second light selector.

11. The pair of shutter glasses according to claim 1,
wherein in the transition period in between periods where the one light selector of the first light selector and the second light selector transitions from the light transmitting state to the light blocking state and the other light selector of the first light selector and the second light selector transitions from the light blocking state to the light transmitting state, a light blocking area of the one light selector sequentially increases in the first direction, while a light transmitting area of the other light selector sequentially increases in the first direction, the light transmitting area of the other light selector being smaller than the light blocking area of the one light selector.

12. An image display system comprising:
the shutter glasses according to claim 1;
a display section that displays an image;
a display control section that drives the image displayed on the display section to a first image in a first period and to a second image in a second period, the first and second periods alternately switched to each other; and
a shutter control section that controls the operation of the first light selector and the second light selector,
wherein the shutter control section brings the first light shutter to transition from the light blocking state to the light transmitting state before a first image start timing at which a first image is displayed on the display section and brings the second light shutter to transition from the light transmitting state to the light blocking state after the first image start timing, and brings the first light shutter to transition from the light blocking state to the light transmitting state before a second image start timing at which a second image is displayed on the display section and brings the second light shutter to transitions from the light transmitting state to the light blocking state after the second image start timing.

* * * * *